(12) United States Patent
Prasad et al.

(10) Patent No.: US 6,382,824 B1
(45) Date of Patent: *May 7, 2002

(54) FIBER OPTICS ILLUMINATORS AND LIGHTING SYSTEM

(75) Inventors: Sipra Sally Prasad, Warminster; Dennis Alan Costandino, Jr., Norristown, both of PA (US); Raymond Charles Heising, Atlanta, GA (US); Robert Theodore Cruz, Jr., Harrisburg, PA (US)

(73) Assignees: Fiberstars Incorporated, Solon, OH (US); Drexel University, Philadelphia, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,826

(22) Filed: May 29, 1998

Related U.S. Application Data
(60) Provisional application No. 60/048,724, filed on Jun. 2, 1997.

(51) Int. Cl.[7] .............................. F21V 7/04; G02B 6/00; G09F 13/00
(52) U.S. Cl. ...................... 362/551; 362/559; 362/284; 362/293; 385/901
(58) Field of Search .................................. 362/583, 580, 362/581, 559, 551, 294, 293, 284, 324, 802, 554, 556; 385/94, 120, 901; 40/547

(56) References Cited

U.S. PATENT DOCUMENTS

| | | | |
|---|---|---|---|
| 4,363,080 A | 12/1982 | Sylvester | |
| 4,425,599 A | 1/1984 | Rieder et al. | |

(List continued on next page.)

FOREIGN PATENT DOCUMENTS

| | | |
|---|---|---|
| DE | 3928404 A | 4/1991 |
| DE | 4327173 A1 | 2/1995 |
| DE | 19508752 A1 | 9/1996 |
| FR | 2718535 | 10/1995 |
| IT | 1171 996 B | 6/1987 |
| JP | Hei 6-186431 | 7/1994 |
| JP | Hei 7-2752514 | 10/1995 |
| JP | Hei 8-106059 | 4/1996 |
| JP | HEI 8-279308 | * 10/1996 |
| JP | Hei 9-178946 | 7/1997 |
| SU | 1341447 A1 | 7/1985 |
| WO | WO97/10471 | 3/1997 |
| WO | WO 97/15853 | 5/1997 |

*Primary Examiner*—Cassandra Spyrou
*Assistant Examiner*—Leo Boutsikaris
(74) *Attorney, Agent, or Firm*—Charles E. Bruzga

(57) ABSTRACT

A fiber optics illuminator is described having a light source, an infrared filter, an optional optical lens, an optical fiber holder, all aligned on the optical axis, a housing, a fan drawing or blowing air, and optionally a color filter or colorwheel with an electric motor. This illuminator is cost efficient, avoids premature fiber degradation, and preserves life of plastic optical fiber. Another embodiment is a fiber optics illuminator having one or more components that are controlled by a signal. A remote source lighting system is described having a plurality of illuminators that have synchronized operations and color sequences.

6 Claims, 2 Drawing Sheets

U.S. PATENT DOCUMENTS

| | | | |
|---|---|---|---|
| 4,572,164 A | | 2/1986 | Yoshida et al. |
| 4,613,931 A | | 9/1986 | Messinger |
| 4,704,660 A | | 11/1987 | Robbins |
| 4,747,648 A | * | 5/1988 | Gilliland .................... 350/96.1 |
| 4,773,723 A | | 9/1988 | Cuda |
| 4,825,341 A | | 4/1989 | Awai |
| 4,922,385 A | | 5/1990 | Awai |
| 5,090,791 A | | 2/1992 | Kidder et al. |
| 5,099,399 A | | 3/1992 | Miller et al. |
| 5,111,367 A | | 5/1992 | Churchill |
| 5,127,075 A | * | 6/1992 | Althaus ....................... 385/94 |
| 5,259,056 A | * | 11/1993 | Davenport .................. 385/115 |
| 5,309,330 A | | 5/1994 | Pillers et al. |
| 5,315,683 A | | 5/1994 | Miller |
| 5,341,275 A | | 8/1994 | Ghandehari |
| 5,367,590 A | | 11/1994 | Davenport et al. |
| 5,416,875 A | * | 5/1995 | Keplinger ................... 385/102 |
| 5,436,805 A | | 7/1995 | Hsu et al. |
| 5,479,322 A | | 12/1995 | Kacheria |
| 5,497,295 A | * | 3/1996 | Gehly ......................... 362/32 |
| 5,526,237 A | | 6/1996 | Davenport et al. |
| 5,528,714 A | | 6/1996 | Kingstone et al. |
| 5,613,752 A | | 3/1997 | Vezard |
| 5,636,047 A | | 6/1997 | Lagoutte et al. |
| 5,673,343 A | * | 9/1997 | Oritz ........................... 385/31 |
| 5,737,472 A | * | 4/1998 | Bernasson .................. 385/123 |
| 5,758,955 A | * | 6/1998 | Belliveau .................... 362/293 |
| 5,779,353 A | * | 7/1998 | Kacheria .................... 362/293 |
| 5,799,124 A | * | 8/1998 | Zorn ........................... 385/125 |
| 5,803,575 A | | 9/1998 | Ansems et al. |
| 5,845,031 A | * | 12/1998 | Aoki ........................... 385/92 |
| 5,974,273 A | * | 10/1999 | Larkin ........................ 395/162 |
| 6,152,577 A | * | 11/2000 | Rizkin ........................ 362/281 |

* cited by examiner

FIBER OPTICS ILLUMINATORS AND LIGHTING SYSTEM

This application claims the benfit of provisional application 60/048,724, filed Jun. 2, 1997.

BACKGROUND OF THE INVENTION

This invention applies to the field of fiber optics illuminators, and more particular to those illuminators that provide a light source for solid core plastic fiber and bundled plastic or glass fibers. Recently there has been a dramatic growth in the development of large diameter solid core plastic optical fibers. An efficient, low cost means of lighting such fibers is lacking in the known fiber optics illuminators.

The principal disadvantage of currently known fiber optics illuminators is that they produce intense focused light onto the receiving end of solid core and bundled plastic fibers, which tends to heat, age and often burn the surface of the fiber ends in the illuminator, degrading them and ultimately destroying the plastic fibers prematurely. Recommended maximum continuous operating temperature for commercial plastic optical fibers is about 70 degree(s) Celsius (C.), at which point the plastic fiber ends in the illuminator tend to soften, distort and begin to melt. For greater plastic optical fiber life, continuous operational temperatures of the plastic optical fiber should be 40 degrees C. or lower. This is difficult to achieve in most fiber optic illuminators because of the light intensity into the plastic optical fiber.

Many thermal control methods are presently used to reduce the heat to protect the end of the fiber bundles in illuminators. One common method is the use of dichroic ellipsoidal reflector lamps, such as the "MR" (Miniature Reflector) halogen lamps that allow a substantial portion of the infrared energy from the lamp to pass through visible-reflectance dichroic glass reflectors instead of being reflected with the visible light into the focussed beam. Experiments have shown that such MR lamps with power as low as 42 watts will melt plastic optical fibers at the focal point within 15 seconds.

Another additional method commonly used to reduce the heat in the beam is the use of an infrared reflecting dichroic mirror between the lamp and the fiber optical fibers. This reduces the visible energy by only about 10%, and has the effect of reducing the heat load so that the 42 watt bulb will melt the plastic optical fiber ends at the focal point in about 30 seconds.

Further, some illuminators tilt an infrared-transmitting, visible-light-reflecting dichroic mirror at a 45 degree(s) angle to the optical axis, but since the mirror is near Brewster's angle, the visible beam energy is reduced by as much as 50%, and the reflected light is strongly polarized by the grazing reflection. The result is reduced thermal energy in the beam, but the technique usually only doubles the time to plastic optical fiber melting to about 60 seconds.

Further, some illuminators use a high velocity cooling fan to blow air across the end of the plastic optical fiber. This improves cooling, but such systems still do not preclude fiber burning at the focal point within a relatively short time.

After employing all of the foregoing heat removal methods, presently known, most fiber optics illuminators take the final step to prevent melting and burning of plastic optical fibers by defocusing the beam so only a portion of the energy in the visible beam strikes the plastic optical fiber. This technique is characteristic of most presently known illuminators that use 30 watt lamps or larger to illuminate plastic optical fibers. Much of the intentionally-diffused image falls outside the area of the plastic optical fibers, resulting in gross optical inefficiency from this cause alone. As a result, the optical efficiency of most typical prior art illuminators is less than 10%.

Recent fiber optics illuminators, such as disclosed in U.S. Pat. No. 5,099,399, have addressed the heat management problem by incorporating a solid core glass rod positioned in the exit aperature of the illuminator housing, wherein the glass rod attempts to dissipate the heat received from the illuminator, and thereby seperate the heat of the illuminator from the plastic optical fibers. This method is very expensive and inefficient. The glass rod needs to be long in length which substantially increases the size and length of the illuminator. The glass rod absorbs some of the infrared radiation but not enough to prevent the fiber from burning. Further, it is necessary to choose the diameter and length of the glass rod depending on the conical angle of the light emanating from the light source. These diameters and lengths of the glass rod will change according to what type of light source used. In addition, the housing of this illuminator contains cooling fins for cooling the fiber optic. Further, means of coupling fibers to such illuminators becomes a major problem and an additional cost, as an additional component, called a connector, is required to couple the glass rod to the plastic optical fibers. This type of housing is extremely expensive and does not keep the plastic fiber optic at a temperature below 40° C.

Other prior art discloses the use of a glass bundled harness, in lieu of a glass rod, for enabling plastic optical fibers to be coupled to an illuminator. The glass bundled harness loses about 40% of the light transmission, partially due to packing fraction. Further, means of coupling fibers to such illuminators becomes a major problem and an additional cost, as an additional component, called a connector, is required to couple the glass bundled harness to the plastic optical fibers.

Another fiber optic illuminator uses liquid filled lines as a means of transferring heat to cool and protect the fiber optic from degradation and premature failure. This approach is a safety concern and can be very dangerous if the liquid filled lines leak or break and the leaking liquid seeps into the electronics of the illuminator.

Prior art fiber optics illuminators, even with one or more of the forgoing heat removal methods, continue to overheat the fiber ends because the fibers are terminated in a bundle that is supported in a rubber compression bushing, much like a rubber chemical bottle stopper with a hole in the center. The bushings in this widely-used practice hold the fibers centered in the aperture of the illuminator, but the rubber is a thermal insulator that precludes the heat generated at the fiber ends from being conducted or radiated out of the fiber bundle.

The basic purpose of the present invention is to provide a fiber optics illuminator in which the focused energy falls substantially on the face of the receiving end of the solid core or bundled plastic optical fiber with minimal spillover losses, without excessive filtering losses, without rubber compression bushings, without expensive glass bundled fiber harnesses or solid core glass rods, without liquid filled cooling lines, and at operating temperatures within the plastic fiber manufacturers' recommendations.

This invention realizes the reduction of ultaviolet radiation to protect the polymeric nature of the plastic optical fiber, the removal and avoidance of dust from the optical fiber surface which provides for better light transmission and avoids burning of the dust on the light pipe surface, the maintenance of low temperatures, such as 40 degrees C. or below, at the fiber surface which avoids premature fiber degradation, thus preserving the life of the plastic optical fiber, and cost efficient componentry which allows for cost efficient fiber optic illuminators.

The prior art discloses illuminators containing a control circuit which uses a DMX controller or a master/slave circuit. DMX is a programmable language which allows the user to program the timing and sequence of the color filters or colorwheels. This method is expensive and complicated for the end user. For example, the DMX controller costs about $300 (US), without the illuminator components, and requires the end user to learn the programming language. The other prior art, the master/slave unit, adds a method of control for the color filters or colorwheels, but uses external wires to connect all the illuminators in the system. This requires the user to route external wires along the entire remote source lighting system, adding additional cost and unsightly wiring. The control circuit in this improved signal-activated fiber optic illuminator costs about $15 (US) to manufacture. The control circuit of this invention gives users a low cost alternative for a remote source lighting systems utilizing signal-activated fiber optic illuminators.

SUMMARY OF THE INVENTION

The present invention covers a fiber optics illuminator which includes a light source, an infrared lens and optionally an optical lens all coaxially disposed on the optical axis, forming an image of the light source at an optical fiber holder containing plastic optical fiber. A housing encloses the light source, the optional optical lens, the optical fiber holder, an infrared filter and a fan. Through the exit aperture of the housing, disposed on the optical axis, is the heat conductive optical fiber holder. The optical fiber holder contains one or more optical fibers. A fiber optics illuminator of this invention comprises a light source, aligned on an optical axis, energized from a source of electrical power; an infrared filter, aligned on the optical axis, to block infrared radiation emanating from the light source; an optional optical lens, aligned on the optical axis, focusing the light source into one or more optical fibers; a heat conductive optical fiber holder, aligned on the optical axis, the holder having means to affix an ultraviolet filter or piece of glass adjacent to one or more optical fibers, the holder having means for dissipating heat from the ultraviolet filter or piece of glass, the holder having means for dissipating heat from one or more optical fibers, and the holder having sealing means for keeping dust and particulates away from one or more optical fibers; a housing enclosing the light source, the infrared filter, the optional optical lens, the optical fiber holder and a fan, with an exit aperture aligned on the optical axis, and an opening for placing a cooling fan; a cooling fan, drawing heated air through the fan and pulling ambient air through the vents, or blowing ambient air through the fan and blowing heated air through the vents, the vents situated adjacent to the light source, the infrared filter, the optional optical lens and the optical fiber holder, resulting in removal of heat; and optionally, a color filter or colorwheel having an electric motor, aligned on the optical axis, resulting in changing the color of the light exiting the housing.

Further, a signal-activated fiber optics illuminator comprising a housing containing a light source, an optical fiber holder, and an exit aperture; optionally, a stationary color filter or a colorwheel having an electric motor; and a control circuit means that is activated by a signal which energizes the light source, and optionally energizes a colorwheel having an electrical motor, and then deactivates the light source and optionally the colorwheel having an electric motor, when a second signal is received.

Further, a synchronized remote source lighting system comprising one illuminator comprising a housing, light source, and an optional optical fiber holder; one or more signal-activated illuminators, optionally having signal-activated colorwheels rotated by an electrical motor, connected in series or in parallel, each comprising a housing, light source, an optical fiber holder, and a control circuit means that is activated by a signal which energizes the light source and optionally the colorwheel rotated by an electrical motor, and then is deactivated when a second signal is received; optionally, one or more signal-activated homing circuits having means to align the illuminators having signal-activated colorwheels in a home position; and optionally, one or more circuits having means to synchronize the rotation of each signal-activated colorwheel.

DESCRIPTION OF THE INVENTION

Figure 1:
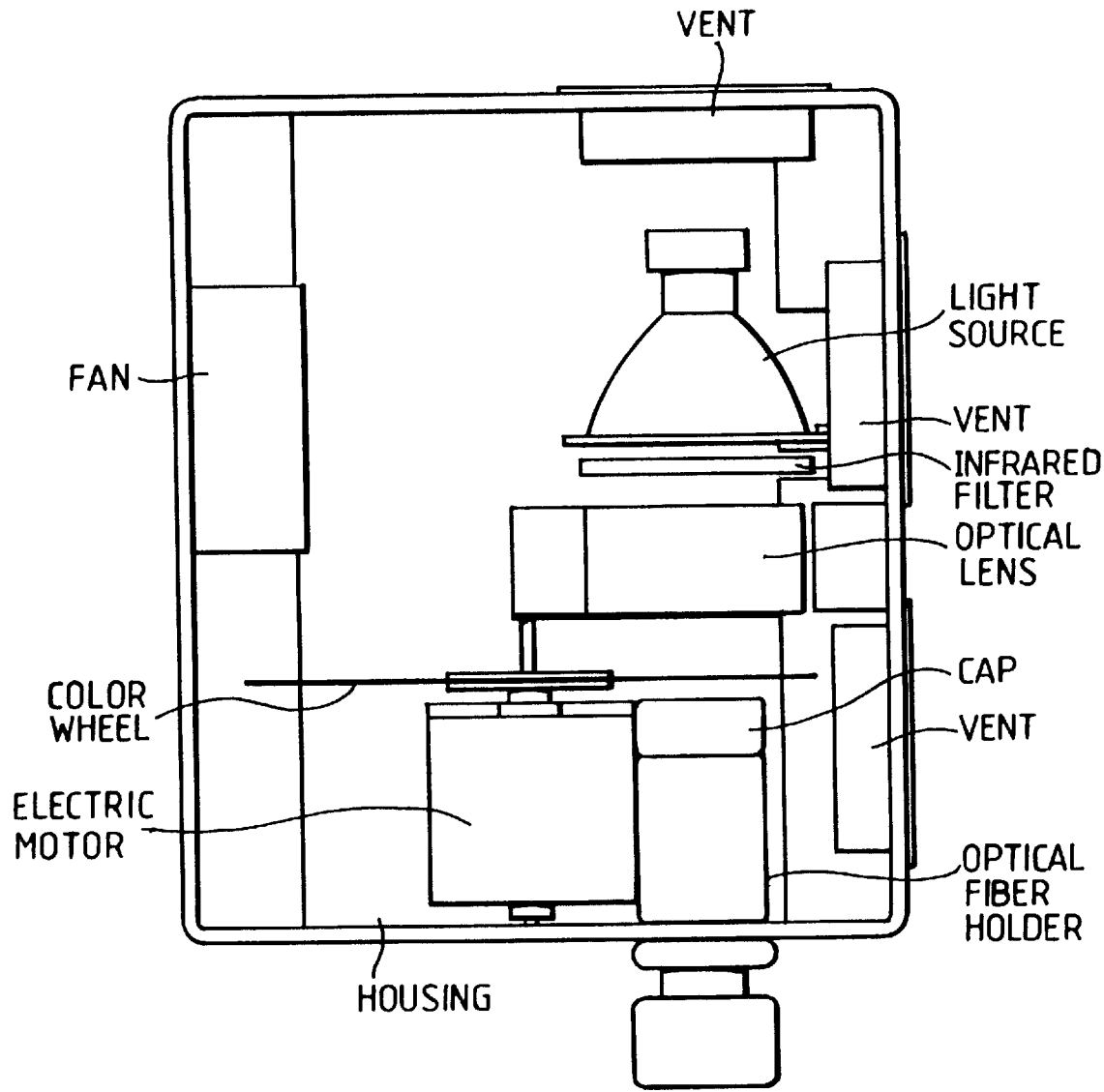
FIG. 1 is a diagram of an embodiment of the fiber optics illuminator according to the present invention.

In FIG. 1 is a fiber optics illuminator according to the present invention. The improved fiber optics illuminator according to this invention comprises a light source aligned on the optical axis, an infrared filter aligned on the optical axis, an optical lens aligned on the optical axis, a optical fiber holder aligned on the optical axis, a housing, a fan drawing or blowing air, and optionally a color filter or colorwheel with electrical motor.

The light source may be any source of light, such as quartz tungsten halogen, gas-discharge (e.g., metal halide), arc (e.g., xenon), incandescent, and fluorescent bulbs. Preferred is a quartz tungsten halogen bulb. Such quartz tungsten halogen bulbs are supplied by many manufacturers and come in various power ratings, typically between 10 and 500 watts (W). Preferred is a MR-16 quartz tungsten halogen bulb having a ellipsoidal reflector diameter of two inches. This bulb has an integral cold mirror that reflects visible light towards the optical fiber holder and transmits infrared radiation (IR) away from the optical fiber holder. It should be appreciated that each type of light source and bulb has a different beam spread, focal distance, and spectrum. Many of these bulbs are inserted into sockets which are powered by alternating current (AC) or direct current (DC). Additionally, other bulbs require a ballast or power supply.

An infrared filter is used to block IR radiation with wavelengths greater than approximately 700 nanometers emanating from the bulb. IR filters can be absorptive or reflective, or both, and usually are made of tempered or untempered glass. Absorptive filters are typically made of infrared opaque glass whereas reflective filters are usually made of one or more spectrally selective thin films deposited onto glass. Tempering the glass of the IR filter makes it more resistant to thermal shock and breakage. Maximum operating temperatures of IR filters are increased from 250° C. to 300° C. when the glass is tempered, as a result tempered glass IR filters are preferred. An IR filter may be positioned in various locations along the optical axis of the fiber optics illuminator, preferably immediately after the light source or after the optical lens.

An optical lens can be used to control the light emanating from the bulb. The optical lens used herein collects, concentrates, and directs (hereinafter "focuses") the light from the light source into one or more optical fibers. The light beam emanating from the lens can be of different widths and focused to different distances from the lens depending on the geometry and refractive index of the lens. For example, lens geometries may be spherical, aspherical, hemispherical, or flat shapes. These lenses are typically made of glass.

Figure 2:
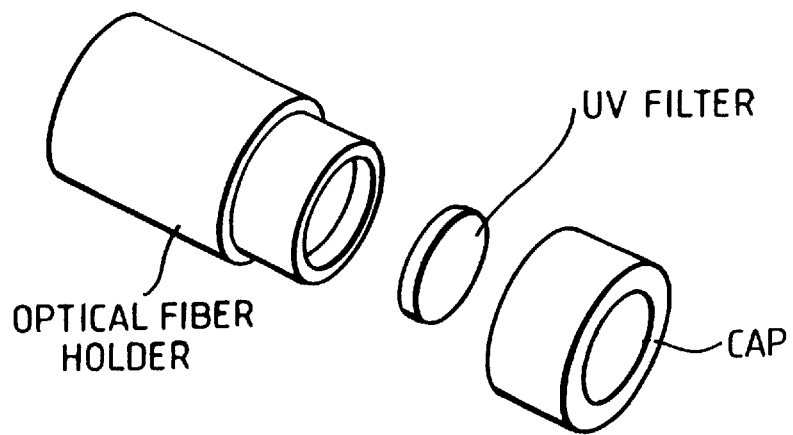
FIG. 2 is an exploded perspective schematic view of an optical fiber holder.

In FIG. 2 is an optical fiber holder constructed of heat conductive materials such as aluminum, copper, or metal alloys thereof. Preferably, the holder is made of aluminum. The optical fiber holder positions and aligns one or more optical fibers on the optical axis to receive the light from the light source. The optical fiber holder contains one or more optical elements such as ultraviolet (UV) radiation filters, IR filters, fused silica lenses, glass lenses, or sapphire lenses. The filters and lenses used as optical elements in the optical fiber holder are not elongated and have a length equal to or less than their diameter. Preferably the holder contains a UV radiation filter which blocks UV radiation emitted from the light source. UV radiation filters can be absorptive or reflective, or both, and usually are made of glass. Absorptive filters are typically made of ultraviolet opaque glass whereas reflective filters are usually made of one or more spectrally selective thin films deposited onto glass. The ultraviolet filter blocks radiation having wavelengths less than 390 nanometers. The UV radiation filter is positioned in the optical fiber holder, for example the UV filter may fit in a groove in the optical fiber holder and can be held in place by a cap which is screwed onto the holder. Various designs for the optical fiber holder are envisioned by the inventors. The light emanating from the source passes through the IR filter, then through the optical lens which focuses the light into the optical fiber holder. One or more optical fibers are inserted into the optical fiber holder such that the inserted ends of the optical fibers are near or in contact with an optical element. The design of the optical fiber holder prevents dust and particulates from contacting the end of the inserted optical fiber. UV radiation absorbed by the UV filter causes the UV filter to generate heat and thereby increase in temperature. This heat will more readily conduct radially into the metal optical fiber holder rather than into the optical fiber, effectively removing heat from the optical fiber, and keeping the temperature of the optical fiber below 40° C. The design of this optical fiber holder does not necessarily require fins to improve heat transfer away from the optical fiber. The design of this invention is a large improvement over U.S. Pat. No. 5,099,399 which only maintains optical fiber temperature at or below 70° C.

The housing encloses the light source, the infrared filter, the optional optical lens, the optical fiber holder, the cooling fan, the optional color filter, and the optional colorwheel with electric motor. The housing is vented to allow air to enter or exit the housing to remove heat. The fan blows or pulls air through the vents of the housing to cool the housing and the components therein. Preferably, the fan sits adjacent to the light source and the IR filter and pulls hot air out of the housing. The housing can be made of construction materials such as metal and plastic. The temperature during operation remains cool enough so that the housing can be constructed of plastics.

Optionally, the fiber optics illuminator incorporates a color filter or a colorwheel which can change the color of the light. The color is changed by placing glass filters with a dichroic coating in the light beam. The filters can also be made of colored plastic. It is preferred that the glass filters have a dichroic coating which reflect IR radiation. The dichroic coating absorbs certain wavelengths of visible light and allows the others to pass through which produces the desired color. Color filters are typically singular or are joined together in a colorwheel. For purposes of multiple colors, it is preferred that the filters are joined together in a colorwheel configuration. The colorwheel is mounted on an electric motor which rotates the colorwheel. The electric motor is energized by an external energy source.

Figure 3:
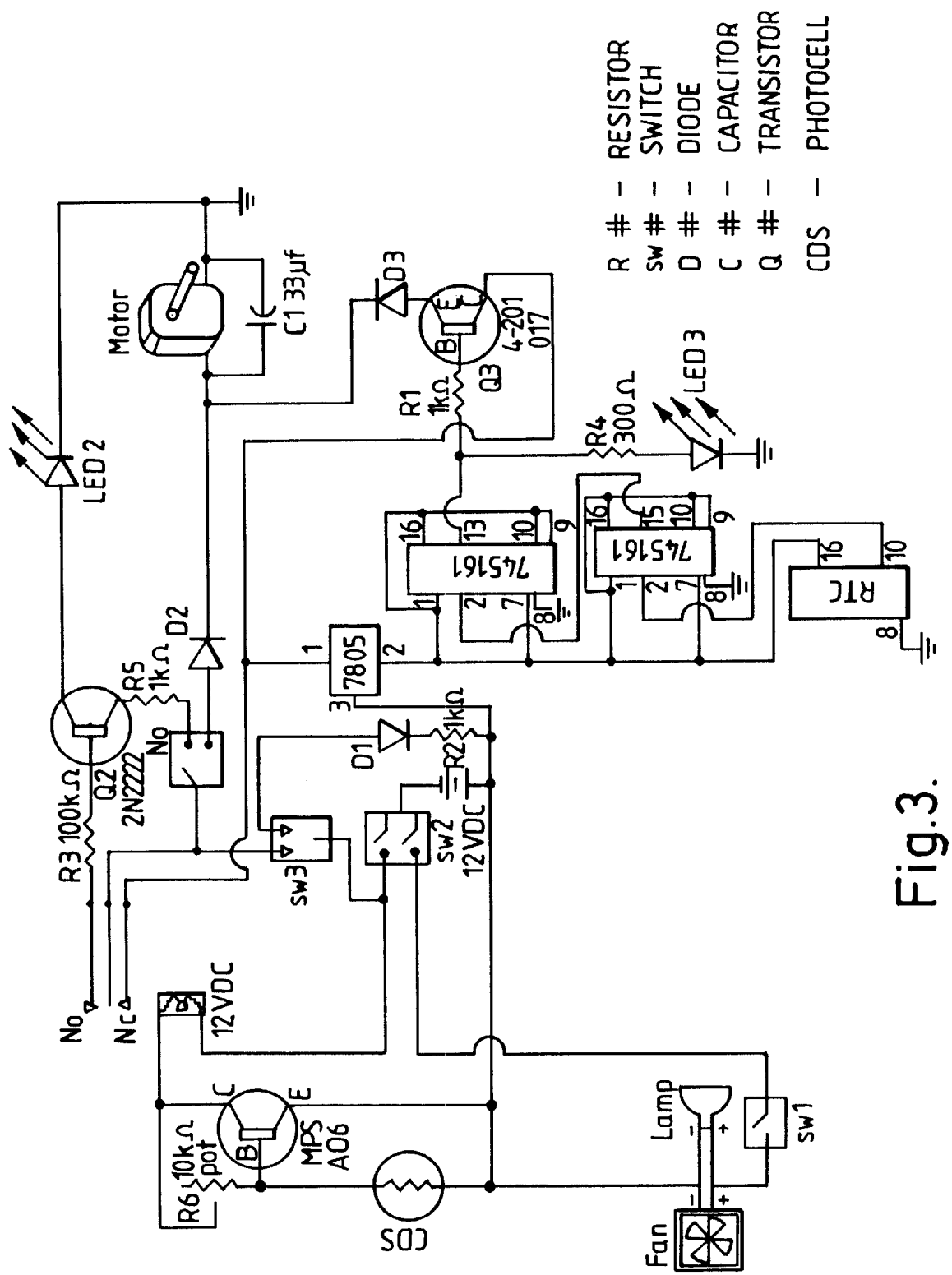
FIG. 3 is an electrical schematic diagram of the signal-activated fiber optics illuminator of this invention.

Another embodiment of this invention is a fiber optics illuminator comprising a light source, an optical fiber holder, an exit aperture and a control circuit that is activated by a signal energizing the light source and optionally energizing a colorwheel rotated by an electrical motor, and deactivated when a second signal is received. A signal is any means of encoding information for transmission from one location to another. Various means can be used to carry signals, such as visible light, infrared radiation, radio waves, electric pulses, and sound. For example, infrared radiation is commonly used in remotely controlling consumer electronic devices such as televisions and compact disk players, and radio waves are used in remote control devices such as automatic garage doors openers. Likewise, circuits are readily designed using similar means for controlling the energizing of light sources and colorwheels in fiber optics illuminators. Preferably, visible light is used as a signal to activate the control circuit in the fiber optics illuminator. This light signal can come from various sources, such as the optical fiber and the light source. This control circuit contains a photocell which detects the light signal and converts it to an electrical signal to activate the control circuit. Various photocells are based on infrared sensors, cadmium sulfide (CdS) photoresistors, photodiodes, charge-coupled devices, and the like, and are used to detect light signals. A CdS photoresistor is used as the photocell in the control circuit in the fiber optics illuminator shown in FIG. 3. This photocell detects the light signal and energizes the electric motor which starts the rotation of the colorwheel. The photocell is connected to a potentiometer, which is a variable resistor. The potentiometer is adjusted to vary the sensitivity of the photocell according to the intensity of the light signal received. According to the circuit diagram in FIG. 3, when the photocell (CdS) detects light, the control circuit sends a signal to an electrical switch which closes the portion of the control circuit that energizes the electric motor. When a second light signal is received, such as sudden darkness on the photocell, the control circuit sends a signal to an electrical switch which opens the portion of the control circuit that deenergizes the electric motor. This light signal can optionally be used to activate another control circuit which energizes the light source, the fan, or any other component of the fiber optics illuminator.

Optionally, a stationary color filter is positioned along the optical axis to provide a single color of illumination exiting the fiber optics illuminator. Several means are envisioned for providing a stationary color filter. One method is having a mechanical override switch in the control circuit connected to the colorwheel motor in the fiber optics illuminator. When the mechanical switch is depressed, a signal is sent to the circuit to stop the motor and the colorwheel in its rotation to provide a stationary color. Likewise, a colored optical element positioned between the light source and the optical fiber along the optical axis would also provide a single colored light. Various colored optical elements such as dichroics were described earlier.

In order to achieve optimal illumination, a single length of fiber may be illuminated by two illuminators, one at each end of the fiber. More generally, a plurality of illuminators can be connected to one another in series or parallel to form a remote source lighting system. In such a case, it is desired that the illuminators be synchronized so that they are all activated and deactivated at the same time, and optionally so that they all have the same color output at the same time, and optionally so they all simultaneously execute the same sequence of colors. The control circuit and means for transmitting and receiving a signal solves this problem.

Another embodiment of this invention is a remote source lighting system in which each illuminator comprises a control circuit, electro-mechanical means for controlling the operating state of the illuminator, a signal transmitter, and a signal receiver. The system also includes a medium for the transmission of the signal. Examples of signals and media are electrical voltage modulations on copper wire, acoustic modulations through the air, infrared radiation modulations through the air, radio frequency modulations through the air, optical modulations through the air, and optical modulations through an optical fiber.

The control circuit is an electronic circuit that can control the signal receiver, decode or interpret the signal into information or instructions, and control the electro-mechanical means for controlling the operating state of the illuminator. Optionally, it can encode information or instructions onto the signal and control the signal transmitter. As further options, it may employ electro-mechanical or opto-mechanical devices, such as shaft encoders, switches, and photodetectors, to sense the operating state of the illuminator and have the capability of encoding and controlling the transmission information concerning the operating state.

Generally, one illuminator, called the "master" uses the means of the control circuit to encode information concerning the operation of the system onto the signal. The signal transmitter then transmits the signal through the medium to the other units, called "slave" units. The other units use the means of the signal receiver to receive the signal, and the control circuit interprets the signal and controls the electro-mechanical means that controls the operating state of the illuminator to perform the actions specified by the encoded signal. For example, the master unit may encode a signal to energize all units ("turn on") onto an electrical voltage that modulates a light emitting diode signal transmitter. The optical signal then propagates through the optical fiber to a slave unit where a silicon photodiode signal receiver receives the signal, subsequent to which the control circuit interprets the signal as instructions to energize the illuminator. The control circuit then enables a solenoid switch means of controlling the operating state that energizes the illuminator.

The preferred signal and medium is optical modulation through the same optical fiber that is used for the illumination function. The signal transmitter is the illumination light source itself, and the receiver is a semiconductor photodetector such as a cadmium sulfide photoresistor. The medium is the optical fiber. The information that is to be transmitted is that the master illuminator has been energized. The signal is the stepwise modulation of the light intensity as the light source is energized. The encoded signal (step in light intensity) is transmitted through the optical fiber to a slave unit, where it impinges upon a cadmium sulfide photoresistive detector. The control circuit senses the change in conductivity in the photodetector, and interprets the change as the information that the master illuminator has been energized. The control circuit then energizes an electrical relay that causes the slave illuminator to energize. Thus, the event of the master illuminator being energized initiates a chain of actions which causes the slave to be simultaneously energized.

In similar fashion, various optional functions may be accomplished. The master and one or more slave illuminators may have a colorwheel rotated by an electric motor. In this case, the control circuit may be capable of controlling the electro-mechanical means that controls the motor of the colorwheel. The information that the master illuminator has been energized and the rotation of the master colorwheel initiated is encoded and transmitted as above, but the slave unit, upon receipt and interpretation, uses its electro-mechanical means to control the state of the illuminator to energize the illuminator and to initiate the rotation of the colorwheel. In this manner, the initiation of the rotation of the master and slave colorwheels is synchronized.

In order to ensure that the colorwheels start in the same position each time the illuminators are turned on, the colorwheels have a designated home position. Homing devices such as optical sensors, binary wheels, and pulse counters can be used. The preferred method in the fiber optics illuminator is a home position designated by a mechanical limit switch which is operated by the control circuit. To keep the colorwheel in motion, an activation signal is given which engages the bypass to the limit switch, so that the motor will not stop when the wheel reaches its home position. When another signal is given, the bypass to the limit switch is turned off so the motor shaft continues to rotate until the mechanical limit switch is engaged. After this point the motor is turned off until another signal is given. The mechanical limit switch is mounted on the motor, and a mechanical lever is mounted on the colorwheel. The lever engages the limit switch for each revolution of the wheel, but if the bypass mechanism is on then the wheel will continue to rotate past the limit switch.

The remote source lighting system of this invention contains the above identified fiber optics illuminators and includes means to start the colorwheels at the same time and position, which overcomes the inaccuracies of the motor (such as gear wear or large tolerances from using inexpensive motors), resulting in the colorwheels coming out of phase. To correct this problem, the control circuit also includes a timing mechanism which forces the wheels of each illuminator to complete one revolution in a specified time period. Such mechanisms achieving time synchronization include quartz crystal oscillators, voltage comparators, steady pulse counters, and asynchronous hand shaking. The preferred method of time synchronization in the fiber optics illuminator uses a real timeclock module, which has the ability to count real time by using binary registers to count pulses. This timer produces a timed square wave oscillation. The peak voltage of the wave directly or indirectly controls the rotation of the motor, and the dead time voltage tells the motor to go to its home position in the remaining time. The time increments of the square wave are precise because the timer is made of a quartz crystal which resonates at a constant frequency. Each fiber optics illuminator in this system has independent identical timers but appears to work together because each fiber optics illuminator has the same starting point. The described and illustrated embodiments of the present invention have been shown to accomplish the basic purpose of the present invention; to minimize light losses by focusing the light into a port where the optical fiber is inserted, to filter unwanted IR and UV radiation, to keep the entire illuminator at a low temperature (below 40° C.), to keep the optical fiber isolated from dust and particulates, to incorporate a means to change the color of the illumination, provides a means for signal-activated illuminators, and to provide an inexpensive system for synchronizing the changing colors of a remote source lighting system. As well, the fiber optics illuminator described herein satisfies the requirements of low cost illuminators to be used with plastic or glass optical fibers.

We claim:

1. A remote source lighting system comprising:
   one master illuminator comprising a housing, a first light source, and an optical fiber holder for an optical fiber which fiber carries light for external illumination;
   one or more signal-activated slave illuminators each comprising a housing, a second light source, and a control circuit means that activates a function of the respective slave illuminator in response to a light signal from the master illuminator which passes through the optical fiber.

2. A remote source lighting system comprising:
   one master illuminator comprising a housing, a first light source, and an optical fiber holder;
   one or more signal-activated slave illuminators having light signal-activated colorwheels rotated by an electrical motor, connected in series or in parallel, each comprising a housing, a second light source, a holder for an optical fiber that carries light for external illumination from the first light source, and a control circuit means that activates the second light source in response to a light signal from the master illuminator which passes through the optical fiber;
   one or more light signal-activated homing circuits having means to align the slave illuminators in a home position; and
   one or more circuits having means to synchronize the rotation of each signal-activated colorwheel.

3. The lighting system of claim 1, wherein the function of the respective slave illuminator is activating the second light source.

4. The lighting system of claim 3, wherein the control circuit means is so constructed as to deactivate the second light source when a second light signal from the master illuminator passes through the optical fiber.

5. The lighting system of claim 2, wherein the each slave illuminator further comprises:
   a colorwheel having an electric motor;
   each control circuit means being so constructed as to also activate the associated color wheel in response to the light signal.

6. The lighting system of claim 2, wherein the control circuit means is so constructed as to deactivate the second light source when a second light signal from the master illuminator passes through the optical fiber.

* * * * *